US012779575B2

(12) United States Patent
Scharrer et al.

(10) Patent No.: US 12,779,575 B2
(45) Date of Patent: Nov. 3, 2026

(54) PRE-SEPARATING DEVICE, JOINING DEVICE, AND METHOD FOR OPERATING A JOINING DEVICE

(71) Applicant: Bayerische Motoren Werke Aktiengesellschaft, Munich (DE)

(72) Inventors: Johannes Scharrer, Bogen (DE); Manuel Walla, Aham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 593 days.

(21) Appl. No.: 18/547,245

(22) PCT Filed: Jan. 19, 2022

(86) PCT No.: PCT/EP2022/051066
§ 371 (c)(1),
(2) Date: Aug. 21, 2023

(87) PCT Pub. No.: WO2022/175004
PCT Pub. Date: Aug. 25, 2022

(65) Prior Publication Data

US 2024/0131609 A1 Apr. 25, 2024
US 2024/0227054 A9 Jul. 11, 2024

(30) Foreign Application Priority Data

Feb. 22, 2021 (DE) ..................... 10 2021 104 140.6

(51) Int. Cl.
*B23K 9/12* (2006.01)
*B21J 15/10* (2006.01)
(Continued)

(52) U.S. Cl.
CPC ................. *B23K 9/12* (2013.01); *B21J 15/10* (2013.01); *B21J 15/32* (2013.01); *B23K 9/0026* (2013.01);
(Continued)

(58) Field of Classification Search
CPC ......... B21J 15/10; B21J 15/32; B23K 9/0026; B23K 9/12; B23K 9/206; B23K 9/327;
(Continued)

(56) References Cited

U.S. PATENT DOCUMENTS 4,519,867 A 5/1985 Rubey
5,015,127 A * 5/1991 Hockman ............ B23P 19/003 81/430
(Continued)

FOREIGN PATENT DOCUMENTS

CN 201002332 Y * 1/2008 ............ B29C 45/76
DE 197 56 798 A1 6/1999
(Continued)

OTHER PUBLICATIONS

English translation of DE 19756798 (Year: 1999).*
(Continued)

*Primary Examiner* — Scott J Walthour
(74) *Attorney, Agent, or Firm* — Crowell & Moring LLP

(57) ABSTRACT

A pre-separating device includes a channel which has a feed opening and an outlet opening and through which joining elements can be conveyed. A first channel-blocking element has a first actuating device and a second channel-blocking element has a second actuating device. Each of the first channel-blocking element and the second channel-blocking element is movable between a blocking position and a passage position. The second channel-blocking element is disposed downstream of the first channel-blocking element in a conveying direction of the joining elements. A first compressed-air supply opening leads into the channel upstream of the first channel-blocking element in the conveying direction and a second compressed-air supply opening leads into the channel between the first channel-blocking element and the second channel-blocking element.

10 Claims, 2 Drawing Sheets

(51) Int. Cl.

| | |
|---|---|
| ***B21J 15/32*** | (2006.01) |
| ***B23K 9/00*** | (2006.01) |
| ***B23K 9/20*** | (2006.01) |
| ***B23K 9/32*** | (2006.01) |
| ***B23P 19/00*** | (2006.01) |

(52) U.S. Cl.
CPC .............. *B23K 9/206* (2013.01); *B23K 9/327* (2013.01); *B23P 19/005* (2013.01)

(58) Field of Classification Search
CPC ........................ B23K 11/0053; B23K 11/0066; B23P 19/005
See application file for complete search history.

(56) References Cited

U.S. PATENT DOCUMENTS

| | | | | |
|---|---|---|---|---|
| 5,688,414 | A * | 11/1997 | Kondo | B23K 9/205 219/98 |
| 9,610,632 | B2 | 4/2017 | Schug et al. | |

FOREIGN PATENT DOCUMENTS

| | | | |
|---|---|---|---|
| DE | 10 2011 113 832 | A1 | 3/2013 |
| EP | 1 362 660 | A1 | 11/2003 |

OTHER PUBLICATIONS

English translation of CN 201002332 (Year: 2008).*
English translation of EP 1362660 (Year: 2003).*
U.S. Appl. No. 18/549,285, "Joining Device and Method for Operating a Joining Device", filed Sep. 6, 2023, Inventor Johannes Scharrer et al.
PCT/EP2022/051066, International Search Report dated May 16, 2022 (Two (2) pages).

* cited by examiner

PRE-SEPARATING DEVICE, JOINING DEVICE, AND METHOD FOR OPERATING A JOINING DEVICE

BACKGROUND AND SUMMARY OF THE INVENTION

The invention concerns a pre-separating device for joining elements, a joining device and a method for operating a joining device.

In motor vehicle construction, e.g., in body construction, a plurality of small joining elements are processed, for example weld-joining elements or rivet elements. In automated processes, the joining tools are usually mounted on an industrial robot which positions the joining tool at the respective joining point. Thus for example, an industrial robot with a bolt welding head successively approaches predefined positions on a vehicle body shell and the joining tool welds a weld bolt to the body at each of these positions.

In order to provide the joining elements at the joining head, usually an element feed system is used. The joining elements are provided, for example, as bulk products, separated in a sorting device and aligned, and transported individually by the element feed system by means of compressed air through a compressed-air supply channel, which may for example be configured as a compressed-air hose, to the joining tool where they are processed. The sorting device is usually positioned outside the working range of the industrial robot, so the joining elements must be transported to the joining tool over a long distance of several meters. If the joining points to be approached by the robot are close together, it may occur that a new joining element has not yet arrived at the joining tool and the robot must wait. This increases the process duration and the down-time of the joining equipment.

In this context, it is an object of the present invention to indicate a possibility of how an automated joining process of joining elements can be improved.

A pre-separating device is indicated for installation in an element feed system, via which joining elements can be conveyed to a joining-element holder at a joining head by means of compressed air. The joining elements may be small welding elements, e.g., balls, double balls, nuts, weld bolts with or without thread, and also small joining elements for other joining processes, e.g., rivet or screw elements.

The pre-separating device comprises a channel which has a feed opening and an outlet opening and through which the joining elements can be conveyed. Via the feed opening, during operation, the joining elements are introduced into the pre-separating device which they leave at the outlet opening after passing through the channel. For example, the pre-separating device is integrated in the pressure conveying channel, so this adjoins the feed opening or outlet opening. Furthermore, the pre-separating device comprises a first channel-blocking element having a first actuating device, and a second channel-blocking element having a second actuating device. Viewed in the conveying direction of the joining elements, the second channel-blocking element is arranged downstream of the first channel-blocking element. In other words, the first channel-blocking element is arranged closer to the feed opening, and the second channel-blocking element is arranged closer to the outlet opening. The channel-blocking elements are spaced apart from one another so far that a channel portion lying in between can receive at least one joining element, and in one embodiment in particular precisely one joining element. The channel-blocking elements are each movable between a blocking position and a passage position. In the blocking position, the channel-blocking element prevents a joining element from being able to move through the channel past the blocking element. In the passage position, the channel-blocking element opens the channel and a joining element can pass. The channel-blocking elements are moved by means of the associated movement devices. The channel-blocking elements may, for example, preferably be configured as pushers which are displaceable transversely to the channel between the blocking position and the passage position.

The pre-separating device furthermore comprises a first compressed-air supply opening which leads into the channel upstream of the first channel-blocking element in the conveying direction, and a second compressed-air supply opening which leads into the channel between the first channel-blocking element and the second channel-blocking element in the conveying direction. The first and second compressed-air supply openings are preferably configured to be connected to a compressed-air supply.

Because of the above-described structure, the pre-separating device provides two channel portions in which a supplied joining element can be stopped in targeted fashion and then transported onward via a compressed-air pulse. This allows the joining element to be transported up to near the joining head, temporarily stored there in a sort of "waiting" position, and supplied to the joining head as required, while a new joining element is already being conveyed into a "waiting" position. A first waiting position is here located in front of the first channel-blocking element, and a second waiting position in front of the second channel-blocking element. The final feed from the pre-separation device up to the joining head therefore takes very much less time than the transport from the bolt sorter to the joining head. Previously, the start of the joining process, e.g., bolt welding, was dependent on the joining element covering the long distance from the storage container or joining element sorter up to the welding head. The process can only begin when the joining element has arrived at the joining head. Because of the pre-separating device, the time between two welds is now no longer coupled to the time required to transport a joining element from the storage container or joining element sorter to the joining head. Rather, only a very much shorter distance must be travelled, namely the distance from the waiting position to the joining head, so the time necessary for this is reduced. Thus the unproductive time between two joining processes can be reduced, whereby the entire process time is shortened and the utilization of the equipment is improved. In order to optimize the process time, in one embodiment it is particularly advantageous if the pre-separating device is arranged stationarily with respect to a mobile joining head and, for example, mounted therein. Thus the distance between the pre-separating device and the joining element holder in the joining head can be reduced to a minimum.

In one embodiment, it is provided that the first and second actuating devices are pneumatic cylinders. The channel-blocking elements can thus be moved using compressed air which is in any case necessary for operation of the element feed system. Such a configuration only has low investment and installation costs. For a simple and low-cost structure of the pre-separating device, it is advantageous if, in one embodiment, the first actuating device comprises a single-action pneumatic cylinder for moving the first channel-blocking element into the blocking position. On a single-action cylinder, there is only one connection for compressed air. The inflowing compressed air moves the piston in one direction, and the channel-blocking element is accordingly moved into the blocking position. In order to return the cylinder to its base position (channel-blocking element opens the channel), the air is discharged from the cylinder and a mechanical spring pushes the piston back into the base position. The first channel-blocking element, situated closer to the feed opening, does not require a particularly rapid return to the passage position, so the single-action cylinder constitutes a particularly economic possibility for technical implementation.

In a further preferred embodiment, the second actuating device comprises a double-action pneumatic cylinder for moving the second channel-blocking element into both the blocking position and the passage position. The double-action cylinder requires compressed air for each movement direction. With this cylinder type, force is built up via the compressed air in both the extension and the retraction directions. This results in a particularly rapid movement of the cylinder into both end positions. Firstly, in this way it can be additionally ensured that the element advanced by the compressed air has actually stopped. Secondly, this embodiment allows a particularly compact construction of the pre-separating device, since the channel length necessary for safe stoppage of the joining element can be reduced.

In a preferred embodiment, the pre-separating device furthermore comprises a first compressed-air line via which the first actuating device, the second actuating device and the second compressed-air supply opening can be jointly loaded with compressed air. Here, the first actuating device is configured to move the first channel-blocking element into the blocking position, and the second actuating device is configured to move the second channel-blocking element into the passage position when the first compressed-air line is loaded with compressed air. This gives an opposing movement of the blocking elements, which means that is no risk of a further joining element being pushed up from behind when a joining element is moved from a position in front of the second blocking element up to the tool head. The common compressed-air line allows common actuation, whereby a simple and economic structure is achieved.

It is advantageous if, in one embodiment, furthermore a second compressed-air line is provided, via which the second actuating device and the first compressed-air supply opening can be jointly loaded with compressed air, and the second actuating device is configured to move the second channel-blocking element into the blocking position when the second compressed-air line is loaded with compressed air. This can ensure that a joining element "parked" in front of the first channel-blocking element is moved forward by the compressed air at the same time as the second channel-blocking element is moved into the blocking position, so that the joining element is stopped at the second channel-blocking element. The further movement of the joining element from the first channel-blocking element to the second channel-blocking element can thus be implemented in a particularly simple fashion without separate control units.

Furthermore, a joining device is indicated with a mobile joining head with joining tool which is arranged on a multiaxis industrial robot. The multiaxis robot holds and guides the joining head with joining tool and allows its repositioning between two joining processes. The joining device furthermore comprises an element feed system with a compressed-air conveying channel, in which the above-described pre-separating device is integrated and with which joining elements can be transported from a sorting device, in which they are separated and positionally correctly oriented, to the mobile joining head by means of compressed air. In the joining head, they are positioned in an element holder which holds the joining element in a defined position at the start of the joining process. The pre-separating device is here arranged stationarily relative to the joining head. The compressed-air conveying channel preferably extends from the sorting device to the feed opening in the pre-separating device. The compressed-air conveying channel may have a further portion which extends from the outlet opening of the pre-separating device up to the joining element holder in the joining head. The element feed system may, for example, also include or be connected to a compressed-air supply.

Furthermore, a control device is provided which is configured for actuating the joining tool and controlling the element feed system.

The joining head is in particular configured to join the joining elements, supplied via the element feed system, in a joining process, e.g., to a further component. The joining head with joining tool may, for example, be a welding head for welding the joining elements, in particular a drawn-arc welding head. Accordingly, in a preferred embodiment, the joining device is configured as a welding device or drawn-arc welding device. The joining head may also be a riveting head for riveting or a screwing tool for screwing the joining elements. It is also conceivable that the joining head comprises other joining tools, e.g., a clinching tool.

It is particularly preferred if, in one embodiment, the first control device is configured to generate a first signal which firstly causes a joining element to be moved into the pre-separating device through the compressed-air conveying channel, and secondly causes the first compressed-air line to be loaded with compressed air. In this way, the supply of a new joining element to the pre-separating device may be coupled to the simultaneous onward transport to the joining head of a joining element already present in the "waiting" position in the pre-separating device.

A preferred embodiment provides that as the first signal, a signal is used which is also used to control the joining head. Preferably, the first signal indicates that the joining head is in a loading state, or the first signal causes the joining head to be put into a loading state. A "loading state" here means that the joining head is ready to receive a joining element. If the joining head for example is a bolt welding head with loading pin, this welding head is in the loading state when the loading pin is retracted. A corresponding first signal then indicates that the loading pin is retracted, or the loading pin in the welding head is retracted because of this signal. Bolt welding heads of other types are configured for example with rotary segments or scoops which can be moved into various positions. Here, similarly, a first signal is used which either indicates that the rotary segment or scoop is in a position in which a joining element can be loaded, or which causes the rotary segment or scoop to be moved into the corresponding position. In other words, separation may be controlled not only via a compressed-air actuation, also via the electrical signal, according to which the joining head is in a loading state or is put into a loading state ("retract loading pin" or "loading pin in back position").

Thus the supply of the joining element from the pre-separating device to the joining head is coupled to a control of the joining device. Furthermore, the control device may be configured to generate a second signal which causes the second compressed-air line to be loaded with compressed air, and a supplied joining element to be moved onward to the joining head, e.g., by extending the loading pin or moving the rotary segment or scoop. Thus the advance of a joining element in the pre-separating device from the first to the second "waiting" position is coupled to the "loading process" inside the joining head. This embodiment achieves particular advantages because no separate control signals are necessary to operate the pre-separating device. Rather, the entire supply of joining elements can be controlled using the same signals which are needed to actuate the joining head. A particularly simple implementation of this actuation is achieved if the first compressed-air line is coupled to a compressed-air line which is used in the joining device to create the loading state (e.g., retract the loading pin). Also, the second compressed-air line may be coupled to a further compressed-air line which is used to move the joining element further into the joining head (e.g., extend the loading pin). The compressed-air supply for separation of the joining elements may be external via an additional air hose, or internal via the air supply to the welding head.

A method is furthermore indicated for operating an above-described joining device with an element feed system, wherein by means of compressed air, joining elements are supplied separately and positionally correctly to the joining head, wherein each joining element is transported via a first compressed-air stream into a first waiting position in front of the first channel-blocking element, and via a second compressed-air stream from the first waiting position into a second waiting position in front of the second channel-blocking element, and then via a third compressed-air stream from the second waiting position to the joining head.

Features and details described in connection with the pre-separating device or the joining device also apply in connection with the method according to the invention and vice versa, so with respect to the disclosure of the individual aspects of the invention, mutual cross-reference is or may be always made.

Further advantages, features and details of the invention arise from the following description in which exemplary embodiments of the invention are described in detail with reference to the drawings. Features mentioned in the claims and in the description may be essential to the invention, both individually or in any combination. Where the term "can" or "may" is used in this application, this concerns both the technical possibility and also the actual technical implementation.

Exemplary embodiments are explained below with reference to the appended drawings.

DETAILED DESCRIPTION OF THE DRAWINGS

Figure 1:
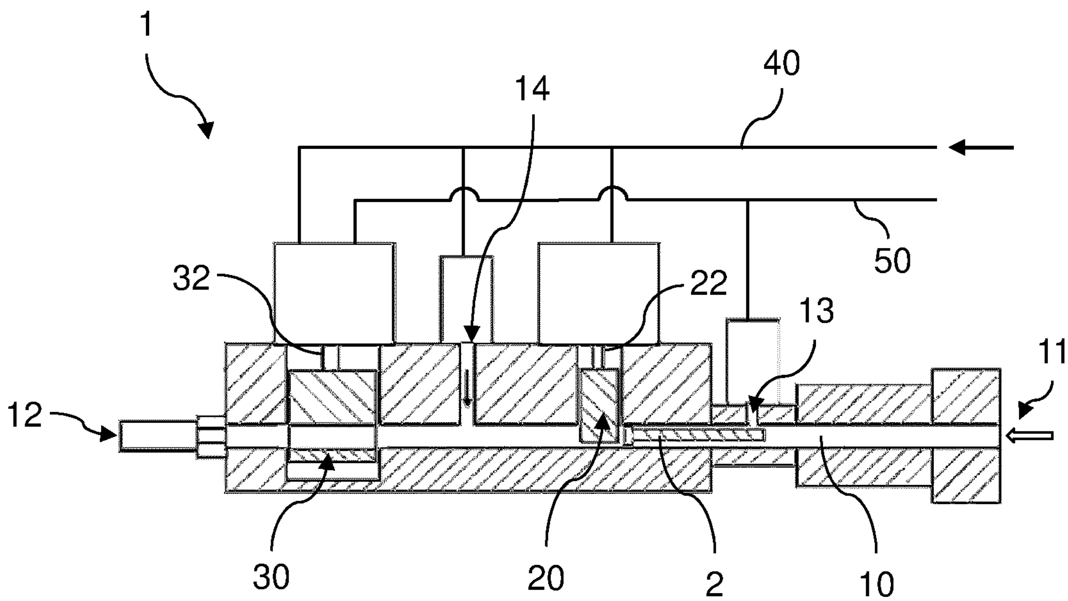
FIG. 1 shows an exemplary pre-separating device.

The pre-separating device 1 has a channel 10 through which joining elements 2 can be conveyed by means of compressed air. The joining elements 2 pass through the channel 10 in the conveying direction from a feed opening 11 to an outlet opening 12, passing by a first compressed-air supply opening 13, a first channel-blocking element 20, a second compressed-air supply opening 14 and a second channel-blocking element 30. The distance between the first and second channel-blocking elements 20, 30 is selected such that at least one joining element 2, and particularly preferably precisely one joining element 2, can be received in the channel portion lying between the channel-blocking elements 20, 30. The first and second channel-blocking elements 20, 30 respectively comprise a first actuating device 22 or second actuating device 32, by means of which they can be moved between a blocking position and a passage position. For example, the first actuating device 22 is designed with a single-action pneumatic cylinder. Using compressed air, the first channel-blocking element 20 can be moved into the blocking position. On discharge of the compressed air, the first channel-blocking element 20 returns to the passage position. The second actuating device 32 is configured for example with a double-action pneumatic cylinder, and can be moved by means of compressed air into the blocking position and into the passage position. The pre-separating device 1 also has a first compressed-air line 40 via which the first actuating device 20, the second actuating device 30 and the second compressed-air supply opening 14 can be jointly loaded with compressed air. If the first compressed-air line 40 is loaded with compressed air, the first channel-blocking element 20 travels into the blocking position, the second channel-blocking element 30 travels into the passage position, and compressed air is blown into the channel via the second compressed-air supply opening 14, as shown in FIG. 1. Furthermore, the pre-separating device 1 has a second compressed-air line 50 via which the second actuating device 32 and the first compressed-air supply device 13 can be jointly loaded with compressed air. If the second compressed-air line 50 is loaded with compressed air, the second channel-blocking element 30 travels into the blocking position and compressed air is blown into the channel 10 via the first compressed-air supply opening 13, shown in FIG. 3.

Figure 2:
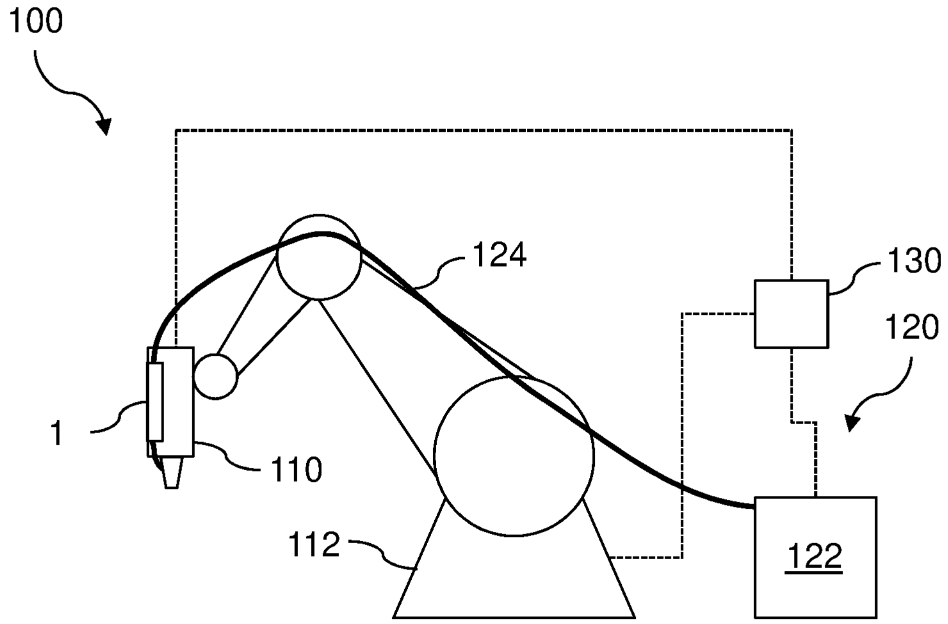
FIG. 2 shows an exemplary joining device with integrated pre-separating device.

The pre-separating device 1 is preferably integrated in an automated joining device 100, see FIG. 2. The joining device has a mobile joining head 110 with joining tool which is attached to a multiaxis industrial robot 112 and can be positioned thereby. For the joining process, the joining head 110 is moved to the respective joining points, where a joining element 2 is joined to a component (not shown) by means of the joining tool. To feed the joining elements 2 up to the joining tool, the joining device 100 furthermore comprises an element feed system 120 via which the joining elements 2, separated in a sorting device 122, can be transported positionally correctly by means of compressed air up to a discharge opening at the joining head 110. The sorting device 122 is usually arranged physically spaced from the industrial robot 112 and is preferably arranged stationarily. The joining elements are conducted to the joining head 110 from the sorting device 122 through a compressed-air conveying channel 124, e.g., in the form of a hose or similar. The pre-separating device 1 is integrated in the element feed system 120 such that the joining elements 2 coming from the sorting device 122 enter the pre-separating device 1 at the feed opening 11 from the compressed-air conveying channel 124, and leave this device at the outlet opening 12, from where they travel further through the compressed-air conveying channel 124 up to the discharge opening at the joining head 112. The pre-separating device 1 is arranged stationarily relative to the joining head 112, e.g., screwed thereto. Furthermore, the joining device 100 has a control device 130 which is configured to actuate the joining head 112 with the joining tool and the element feed system 120, and in some cases to actuate the industrial robot 112.

The function of the pre-separating device 1 and the joining device 100 is explained in the figures using the example of a bolt welding process and a bolt welding device. Also however, other joining elements may be used such as, for example, balls, weld nuts etc., and/or another joining process with another joining device, e.g., a riveting process with automated riveting device.

A joining element 2 is conveyed from the sorting device 122 through the compressed-air conveying channel 124 by means of compressed air. At the same time, the compressed air is conducted through the first compressed-air line 40, whereby the first channel-blocking element 20 travels into the blocking position, see FIG. 1. The weld bolt (or the joining element) 2 coming from the sorting device 122 is stopped at the channel-blocking element 20 and remains in a first waiting position in the channel 10.

Figure 3:
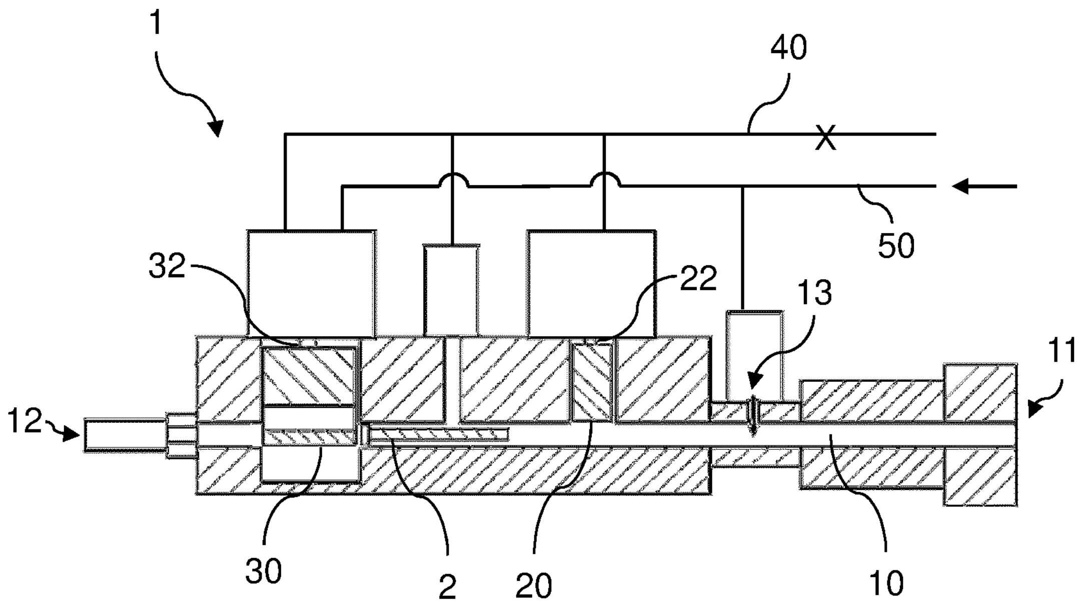
FIGS. 3 and 4 show the pre-separating device from FIG. 1 in various operating positions in order to explain the invention.
Figure 4:
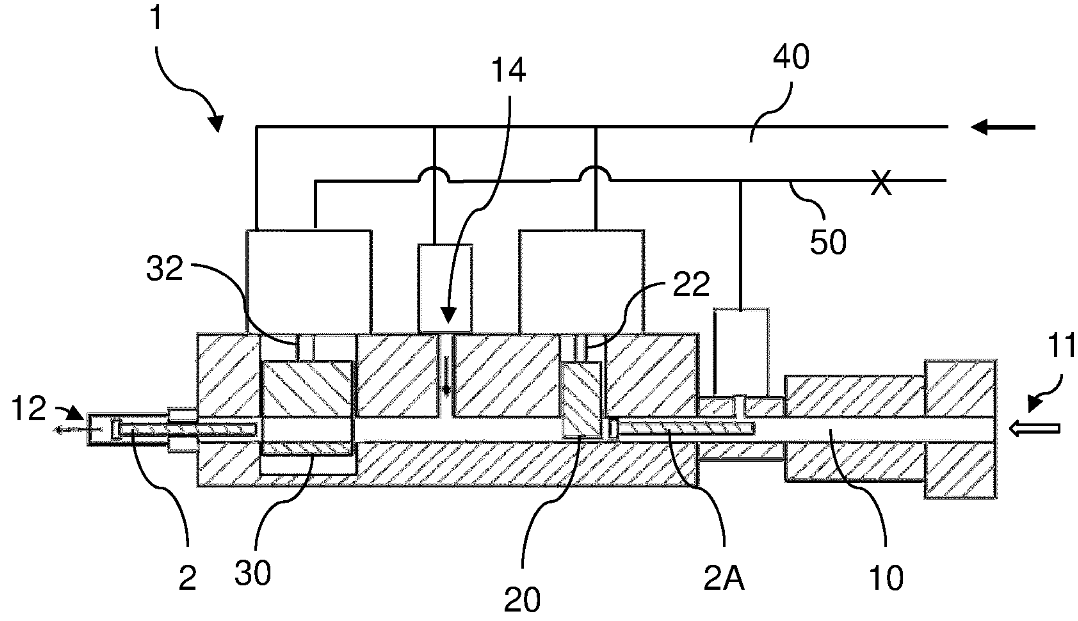

In the next step, see FIG. 3, the compressed-air supply via the first compressed-air line 40 is stopped, whereby the first channel-blocking element 20 is moved back into the passage position. Also, compressed air is conducted via the second compressed-air line 50, whereby the second channel-blocking element 30 travels into the blocking position, and the compressed air is conducted into the channel 10 via the first compressed-air supply opening 13 and pushes the welding bolt 2, present in the first waiting position (FIG. 1), up to the second channel-blocking element 30. The welding bolt 2 is now in a second waiting position between the first and the second channel-blocking elements.

In the next step, the compressed-air supply via the second compressed-air line 50 is stopped, and as already described for FIG. 1, a further weld bolt 2A (or joining element) is pushed from the sorting device 122 into the pre-separating device 1, while the first compressed-air line 40 is loaded with compressed air. The newly supplied weld bolt 2A stops at the first channel-blocking element 20. Via the compressed air in the first compressed-air line 40, the second channel-blocking element 30 is moved into the passage position, and via the second compressed-air supply opening, the compressed air is conducted into the channel 10 so that the weld bolt 2 is pushed out of the second waiting position in the pre-separating device 1 and conveyed on to the joining head 112.

Particularly preferably, the common control device 130 is used to control both the pressurization of the compressed-air lines 40 and 50, and also the feed of a joining element 2 from the sorting device 122 towards the pre-separating device.

In the exemplary joining device shown in FIG. 2, the control device is configured such that the feed of a joining element from the sorting device 122 into the pre-separating device 1 is actuated simultaneously with a pressurization of the first compressed-air line 40 and a retraction of the loading pin of the bolt welding head, e.g., by a common first signal. Furthermore, the control device is configured such that the pressurization of the second compressed-air line 50 and an extension of the loading pin of the bolt welding head are actuated simultaneously, e.g., by a common second signal.

LIST OF REFERENCE CHARACTERS

1 Pre-separating device
2,2A Joining elements
10 Channel
11 Feed opening
12 Outlet opening
13, 14 Compressed-air supply opening
20, 30 Channel-blocking element
22, 32 Actuating device
40, 50 Compressed-air line
100 Joining device
110 Joining head
112 Industrial robot
120 Element feed system
122 Sorting device
124 Compressed-air conveying channel
130 Control device

The invention claimed is:

1. A pre-separating device for installation in an element feed system, the element feed system configured to convey joining elements from a sorting device to a joining-element holder on a joining head by compressed air, the pre-separating device comprising:

a channel which has a feed opening and an outlet opening and through which the joining elements can be conveyed;

a first channel-blocking element having a first actuating device;

a second channel-blocking element having a second actuating device;

wherein each of the first channel-blocking element and the second channel-blocking element is movable between a blocking position and a passage position;

wherein the second channel-blocking element is disposed downstream of the first channel-blocking element in a conveying direction of the joining elements;

a first compressed-air supply opening which leads into the channel upstream of the first channel-blocking element in the conveying direction;

a second compressed-air supply opening which leads into the channel between the first channel-blocking element and the second channel-blocking element in the conveying direction; and a first compressed-air line via which the first actuating device, the second actuating device, and the second compressed-air supply opening can be jointly loaded with compressed air;

wherein the first actuating device is configured to move the first channel-blocking element into the blocking position;

wherein the second actuating device is configured to move the second channel-blocking element into the passage position when the first compressed-air line is loaded with compressed air.

2. The pre-separating device according to claim 1, wherein the first actuating device comprises a single-action pneumatic cylinder for moving the first channel-blocking element into the blocking position.

3. The pre-separating device according to claim 1, wherein the second actuating device comprises a double-action pneumatic cylinder for moving the second channel-blocking element into both the blocking position and the passage position.

4. The pre-separating device according to claim 1, further comprising:

a second compressed-air line via which the second actuating device and the first compressed-air supply opening can be jointly loaded with compressed air;

wherein the second actuating device is configured to move the second channel-blocking element into the blocking position when the second compressed-air line is loaded with compressed air.

5. A joining device (100), comprising:

a multiaxis industrial robot;

a mobile joining head with a joining tool which is disposed on the multiaxis industrial robot;

an element feed system via which joining elements can be transported from a sorting device to the mobile joining head by compressed air; and a control device for actuating the joining tool and controlling the element feed system;

wherein the element feed system includes the pre-separating device according to claim 1 which is disposed stationarily relative to the joining head.

6. The joining device according to claim 5, wherein the joining device is a bolt welding device.

7. The joining device according to claim 5, wherein the control device is configured to generate a first signal via which a joining element is moved from the sorting device towards the tool head by compressed air and wherein the first compressed-air line is loaded with compressed air.

8. The joining device according to claim 7, wherein the first signal is also used to put the joining head into a loading state or the first signal indicates that the joining head is in the loading state.

9. The joining device according to claim 7, wherein the joining head is configured as a bolt welding head with a loading pin, wherein the first signal is also used to arrange a retraction of the loading pin, and wherein the control device is configured to generate a second signal via which a second compressed-air line is loaded with compressed air and the loading pin is extended.

10. A method for operating the joining device according to claim 5, comprising the steps of:

supplying joining elements separately and positionally correctly to the joining head by compressed air, wherein each joining element is supplied:

via a first compressed-air stream into a first waiting position in front of the first channel-blocking element;

via a second compressed-air stream from the first waiting position into a second waiting position in front of the second channel-blocking element; and via a third compressed-air stream from the second waiting position to the joining head.

* * * * *